(12) United States Patent
Reyes et al.

(10) Patent No.: US 11,194,628 B2
(45) Date of Patent: Dec. 7, 2021

(54) WORKLOAD ALLOCATION UTILIZING REAL-TIME ENTERPRISE RESILIENCY SCORING

(71) Applicant: International Business Machines Corporation, Armonk, NY (US)

(72) Inventors: Joseph Reyes, Pelham, NY (US); Bernhard Julius Klingenberg, Grover Beach, CA (US); Hamza Yaswi, Sterling, VA (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 16/701,683

(22) Filed: Dec. 3, 2019

(65) Prior Publication Data

US 2021/0165688 A1 Jun. 3, 2021

(51) Int. Cl.
*G06F 9/50* (2006.01)
*H04L 29/08* (2006.01)
(Continued)

(52) U.S. Cl.
CPC ............ *G06F 9/505* (2013.01); *G06F 9/5088* (2013.01); *G06F 11/2023* (2013.01);
(Continued)

(58) Field of Classification Search
CPC .... G06F 9/505; G06F 9/5088; G06F 11/2023; G06F 11/3006; G06F 11/3433; H04L 67/1008
See application file for complete search history.

(56) References Cited

U.S. PATENT DOCUMENTS

| 6,895,383 B2 | 5/2005 | Heinrich |
| 7,552,480 B1 | 6/2009 | Voss |

(Continued)

FOREIGN PATENT DOCUMENTS

| CN | 103530735 A | 1/2014 |
| CN | 104125217 A | 10/2014 |
| WO | 2006042202 A2 | 4/2006 |

OTHER PUBLICATIONS

Gibson, Carl A., et al., "A 'conceptual models' approach to organisational resilience", The Austrailian Journal of Emergency Management, vol. 25, No. 02, Apr. 2010, 7 pgs.

*Primary Examiner* — Jorge A Chu Joy-Davila
(74) *Attorney, Agent, or Firm* — Maeve M. Carpenter; Hunter E. Webb; Keohane & D'Alessandro, PLLC

(57) ABSTRACT

An approach is provided for providing disaster recovery, active/active and active/standby workload allocation in a networked computing environment according to aspects of the present invention. Risk factor data is obtained for each component of a plurality of components in a global data center. A resiliency score is calculated for each component of the plurality of components based on a set of risk factors that are applicable to the component gathered from the risk factor data. A set of group resiliency scores are computed by aggregating the resiliency scores for each of the plurality of components included in a component group. In response to a determination that an application's performance can be improved, a datacenter is selected for failover protection based on a group resiliency score corresponding to the datacenter. Moreover, the overall enterprise resiliency score can be improved by moving an application between sites in the enterprise.

20 Claims, 8 Drawing Sheets

(51) Int. Cl.
 *G06F 11/30* (2006.01)
 *G06F 11/34* (2006.01)
 *G06F 11/20* (2006.01)
(52) U.S. Cl.
 CPC ...... *G06F 11/3006* (2013.01); *G06F 11/3433* (2013.01); *H04L 67/1008* (2013.01)

(56) References Cited

U.S. PATENT DOCUMENTS

| | | | |
|---|---|---|---|
| 7,603,283 B1 | 10/2009 | Spielmann et al. | |
| 7,689,862 B1* | 3/2010 | Bharthulwar | G06F 11/2046 714/13 |
| 9,612,925 B1* | 4/2017 | Lewis | G06F 16/951 |
| 9,787,709 B2 | 10/2017 | Doubleday et al. | |
| 9,791,837 B2 | 10/2017 | Slessman et al. | |
| 9,824,221 B2 | 11/2017 | Bahl | |
| 2002/0129221 A1 | 9/2002 | Borgia et al. | |
| 2004/0250248 A1* | 12/2004 | Halpern | G06F 9/5033 718/100 |
| 2005/0144062 A1 | 6/2005 | Mittal et al. | |
| 2005/0197952 A1 | 9/2005 | Shea et al. | |
| 2008/0281656 A1* | 11/2008 | Lotlikar | G06Q 10/087 705/7.38 |
| 2010/0042673 A1 | 2/2010 | Dayley | |
| 2010/0114634 A1 | 5/2010 | Christiansen et al. | |
| 2010/0191952 A1* | 7/2010 | Keinan | G06Q 10/06 713/100 |
| 2010/0235431 A1* | 9/2010 | Poluri | G06F 11/2066 709/203 |
| 2010/0293617 A1 | 11/2010 | Wool | |
| 2011/0126111 A1 | 5/2011 | Gill et al. | |
| 2011/0271136 A1* | 11/2011 | Abbot | G06F 11/2023 714/2 |
| 2011/0283149 A1* | 11/2011 | Richmond | G06F 11/3006 714/39 |
| 2012/0011590 A1 | 1/2012 | Donovan | |
| 2013/0086268 A1* | 4/2013 | Sloma | G06F 9/50 709/226 |
| 2014/0006581 A1* | 1/2014 | Raghu | G06F 9/5072 709/223 |
| 2014/0164184 A1* | 6/2014 | Akolkar | G06Q 30/0611 705/26.61 |
| 2017/0046247 A1* | 2/2017 | Nutter | G06Q 10/063 |
| 2017/0134237 A1 | 5/2017 | Yang et al. | |
| 2017/0295108 A1* | 10/2017 | Mahindru | H04L 47/805 |
| 2018/0089017 A1 | 3/2018 | Cook et al. | |
| 2018/0189146 A1 | 7/2018 | Banasik et al. | |
| 2018/0293120 A1* | 10/2018 | Arora | G06F 11/3006 |
| 2021/0157694 A1* | 5/2021 | Dye | G06F 11/2023 |

* cited by examiner

| | |
|---|---|
| HIGH | 61-100 |
| MEDIUM | 31-60 |
| LOW | 1-30 |

| ATTRIBUTE | SEVERITY LEVEL | WEIGHT (NUMBER) |
|---|---|---|
| SMALL ISSUES DURING LAST ACTUAL DISASTER (WITHIN 20% OF THE INDUSTRY SPECIFIED RTO) | LOW | 25 |
| MEDIUM ISSUES DURING LAST ACTUAL DISASTER (MORE THAN 20% BUT LESS THAT 50%) | MEDIUM | 50 |
| MAJOR ISSUES DURING LAST ACTUAL DISASTER (MORE THAN 50% OF THE INDUSTRY SPECIFIED RTO) | HIGH | 80 |
| CURRENT RPOS VS. INDUSTRY EXPECTED RPOS | HIGH | 90 |
| ANNUAL TEST REQUIREMENTS MET T - 1 YEAR | HIGH | 70 |
| ANNUAL TEST REQUIREMENTS MET T - 2 YEAR | MEDIUM | 40 |
| ANNUAL TEST REQUIREMENTS MET T - 3 YEAR | LOW | 20 |
| AVAILABLE CAPACITY FOR DR - DR VS PRODUCTIONS - PER APPLICATION | MEDIUM | 35 |
| AVAILABLE CAPACITY FOR DR - DR VS PRODUCTIONS - ACROSS ORGANIZATION | HIGH | 65 |
| SPEED AND LATENCY OF NETWORK FOR REPLICATION | MEDIUM | 35 |
| REPLICATION MECHANISM -- DATA CONSISTENCY | MEDIUM | 40 |
| ABILITY TO DETECT RISKS THAT COULD LEAD TO DISASTER (I.E. MONITORING TOOLS) | LOW | 20 |
| SELF HEALING/PERCENTAGE OF HOW REDUNDANT THE INFRASTRUCTURE IS | MEDIUM | 60 |
| GEO DIVERSE DATACENTERS | MEDIUM | 35 |
| LOCATION OF DATACENTER (HOW VULNERABLE TO NATURAL CALAMITIES/TERROR) | LOW | 10 |
| DEPENDENCY MAPPING AND RUN BOOKS (QUALITY AND LAST UPDATED AND LAST TESTED) | MEDIUM | 60 |
| CHANGE MANAGEMENT PROCESS INFRACTIONS - ENSURE RUNBOOK ACCURACY | LOW | 25 |
| AUTOMATION TOOLS (LIKE CRO) | HIGH | 80 |
| END OF SUPPORT EQUIPMENT IN PRODUCTION | HIGH | 90 |

WORKLOAD ALLOCATION UTILIZING REAL-TIME ENTERPRISE RESILIENCY SCORING

TECHNICAL FIELD

The present invention relates generally to workload allocation. More specifically, aspects of the present invention provide solutions that can provide application-level disaster recovery, active/active, and active/standby workload allocation in a networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver services online via a remote server, which can be accessed via a web service and/or software, such as a web browser. Individual clients can run virtual machines (VMs) that utilize these services and store the data in the networked computing environment. This can allow a single physical server to host and/or run many VMs simultaneously.

Computer applications are pieces of computer software that help a user thereof perform a task or a number of related tasks. In the electronic environment of today, these applications are often provided in such a way as to be accessible to a number of users. To accomplish this, a provider of the application may host the application from a particular location that is accessible via a network, such as a local area network or wide area network, such as the Internet. To facilitate this, applications can be spread across multiple global datacenters, networked computing environments, cloud computing environments, etc., worldwide.

In hosting the application, the provider usually hopes to attain a state in which the application is available to users in a continuous manner. However, sometimes problems arise that may cause availability to be interrupted. For example, a cyber event, a catastrophic disaster, such as an earthquake, fire, etc., could occur at the primary host site. In the alternative, the machine or machines may experience hardware and/or software malfunctions that cause the application to cease performing. Alternatively, communications between the host and the network may be lost, resulting in an inability of users to access the application. In a multi-datacenter environment, IT personnel often must manage global IT infrastructure application dependencies, regulatory compliance, resilience governance, risk factors, etc., to mitigate degradation of application availability. The resiliency of a datacenter, multi-datacenter environment, hosted application, etc., can be defined as the continued availability of the resource over time.

In any case, when events such as those described above occur and components (e.g., hardware and/or software component) become unavailable, providers often perform disaster recovery to restore application functionality to users. Currently, providers can prepare for disaster recovery in several ways. Many companies opt for an active/dormant solution in which the primary site is live and active and replicates to one or more disaster recovery servers, which are not live, in the background. During a disaster recovery (DR) event, the traffic fails over to the disaster recovery site and the previously dormant server or servers assume the full workload.

SUMMARY

In general, aspects of the present invention provide an approach for providing disaster recovery, active/active, and active/standby workload allocation in a networked computing environment. Risk factor data is obtained for each component of a plurality of components in a global data center. A resiliency score is calculated for each component of the plurality of components based on a set of risk factors that are applicable to the component gathered from the risk factor data. A set of group resiliency scores are computed by aggregating the resiliency scores for each of the plurality of components included in a component group. In response to a determination that an application's performance can be improved (e.g., due to an interruption to an application, the existence of a site with a better resiliency score, and/or based on business processes), a datacenter is selected for failover protection based on a group resiliency score corresponding to the datacenter. Moreover, the overall enterprise resiliency score can be improved by moving an application between sites in the enterprise.

A first aspect of the invention provides a method for providing workload allocation in a networked computing environment, comprising: obtaining, for each component of a plurality of components in a global data center, risk factor data for the global data center; calculating a resiliency score for each component of the plurality of components based on a set of risk factors that are applicable to the component gathered from the risk factor data; computing a set of group resiliency scores by aggregating the resiliency scores for each of the plurality of components included in a component group; and selecting, in response to an interruption to an application, a datacenter for failover protection based on a group resiliency score corresponding to the datacenter.

A second aspect of the invention provides an enterprise computing environment, comprising: a set of computer data centers; a plurality of servers within each data center of the set of data centers, each server plurality of servers hosting a set of applications; an enterprise orchestrator that manages the set of applications corresponding to each of the plurality of servers within the set of computer data centers, the enterprise orchestrator including a method providing workload allocation in the enterprise computing environment, the method comprising: obtaining, for each component of a plurality of components in a global data center, risk factor data for the global data center; calculating a resiliency score for each component of the plurality of components based on a set of risk factors that are applicable to the component gathered from the risk factor data; computing a set of group resiliency scores by aggregating the resiliency scores for each of the plurality of components included in a component group; and selecting, in response to an interruption to an application, a datacenter for failover protection based on a group resiliency score corresponding to the datacenter.

A third aspect of the invention provides a computer program product embodied in a computer readable storage medium that implements a method for providing workload allocation in a networked computing environment, the method comprising: obtaining, for each component of a plurality of components in a global data center, risk factor data for the global data center; calculating a resiliency score for each component of the plurality of components based on a set of risk factors that are applicable to the component gathered from the risk factor data; computing a set of group resiliency scores by aggregating the resiliency scores for each of the plurality of components included in a component group; and selecting, in response to an interruption to an application, a datacenter for failover protection based on a group resiliency score corresponding to the datacenter.

Still yet, any of the components of the present invention could be deployed, managed, serviced, etc., by a service provider who offers to provide workload allocation in a networked computing environment.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which:

FIG. 7 depicts a table of example risk factor data according to an embodiment of the invention.

Figure 1:
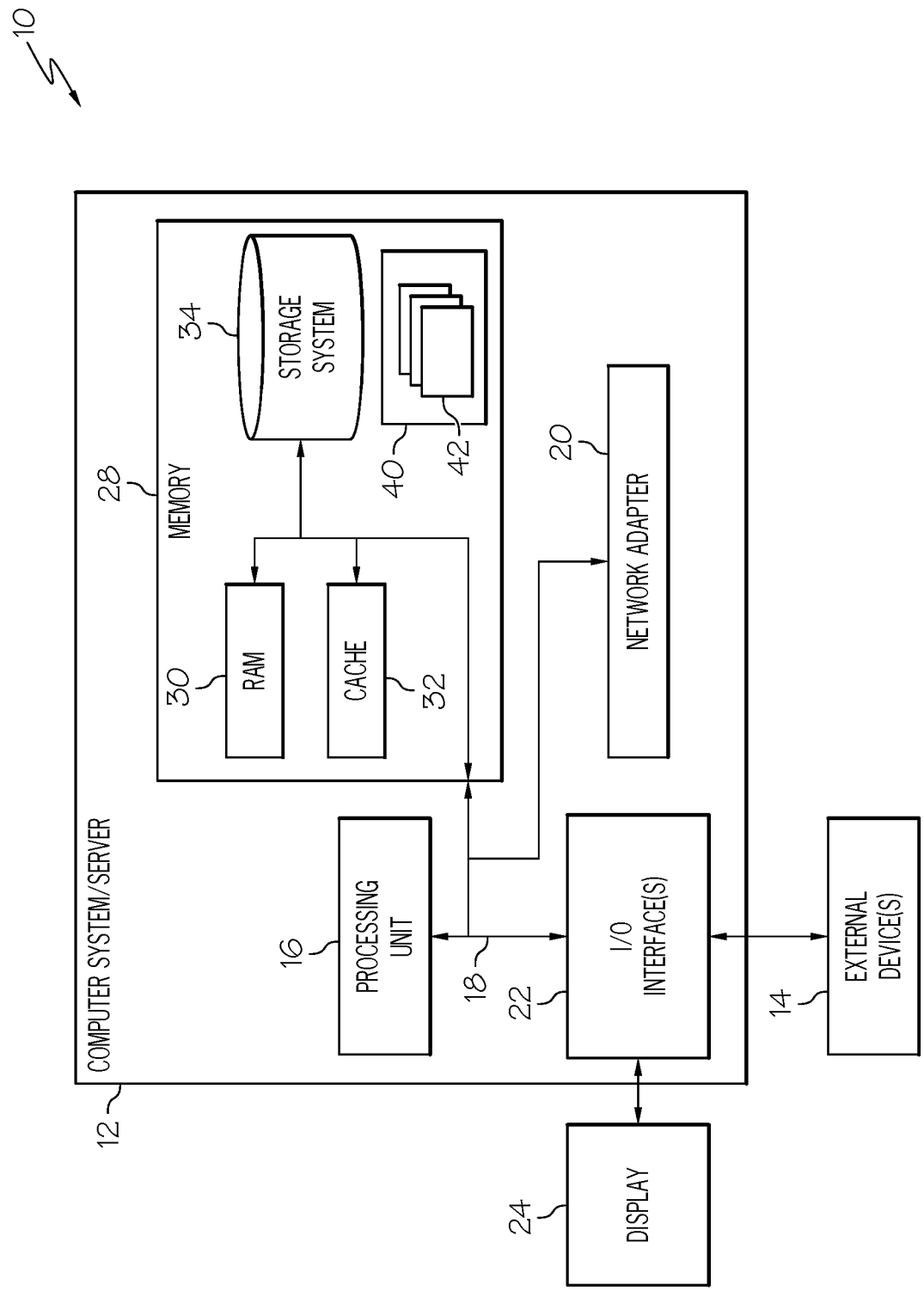
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for providing disaster recovery, active/active and active/standby workload allocation in a networked computing environment. Risk factor data is obtained for each component of a plurality of components in a global data center. A resiliency score is calculated for each component of the plurality of components based on a set of risk factors that are applicable to the component gathered from the risk factor data. A set of group resiliency scores are computed by aggregating the resiliency scores for each of the plurality of components included in a component group. In response to an interruption to an application, a datacenter is selected for failover protection based on a group resiliency score corresponding to the datacenter. Moreover, the overall enterprise resiliency score can be improved by moving an application between sites in the enterprise.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
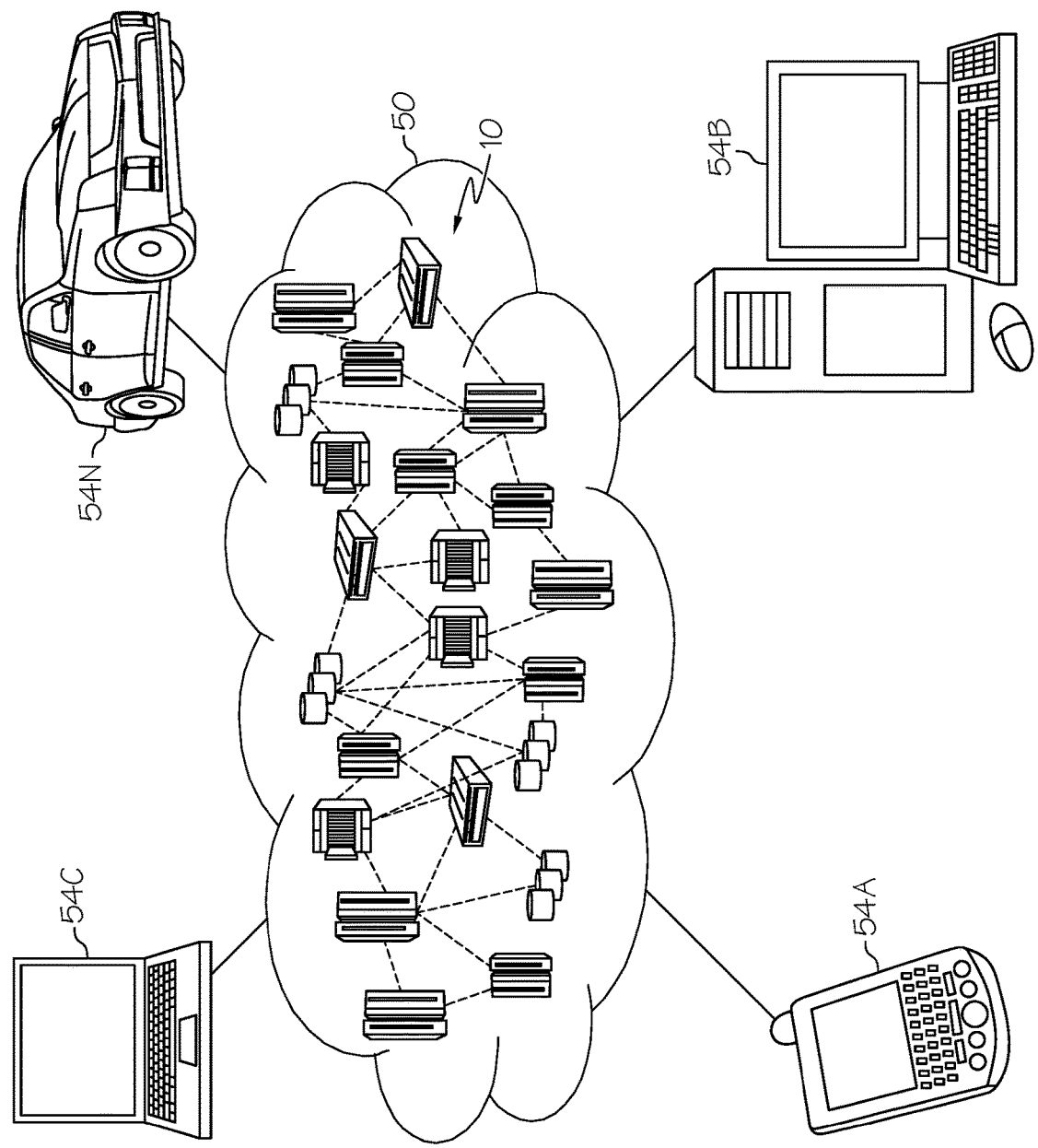
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
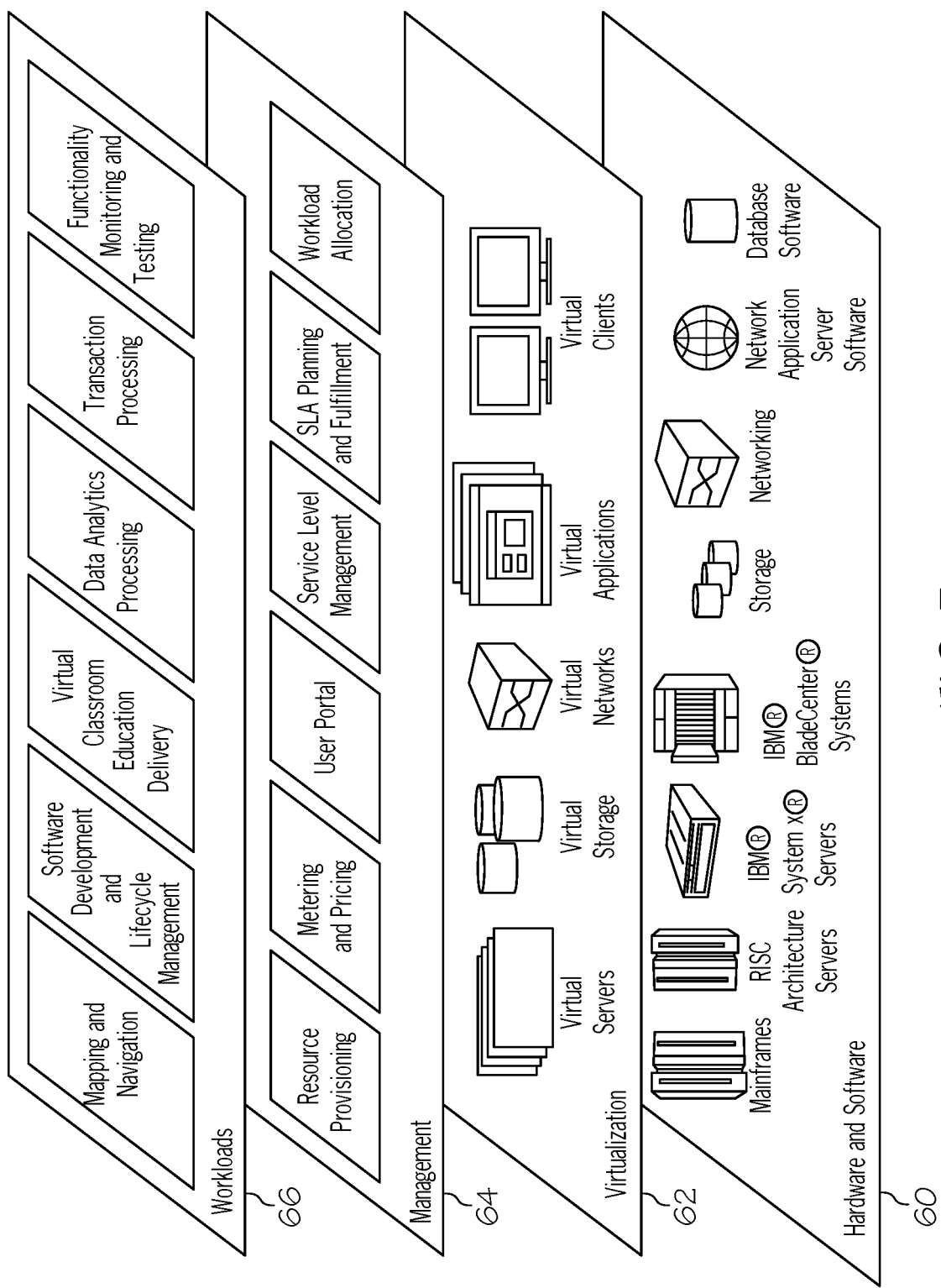
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is workload allocation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality monitoring and testing. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
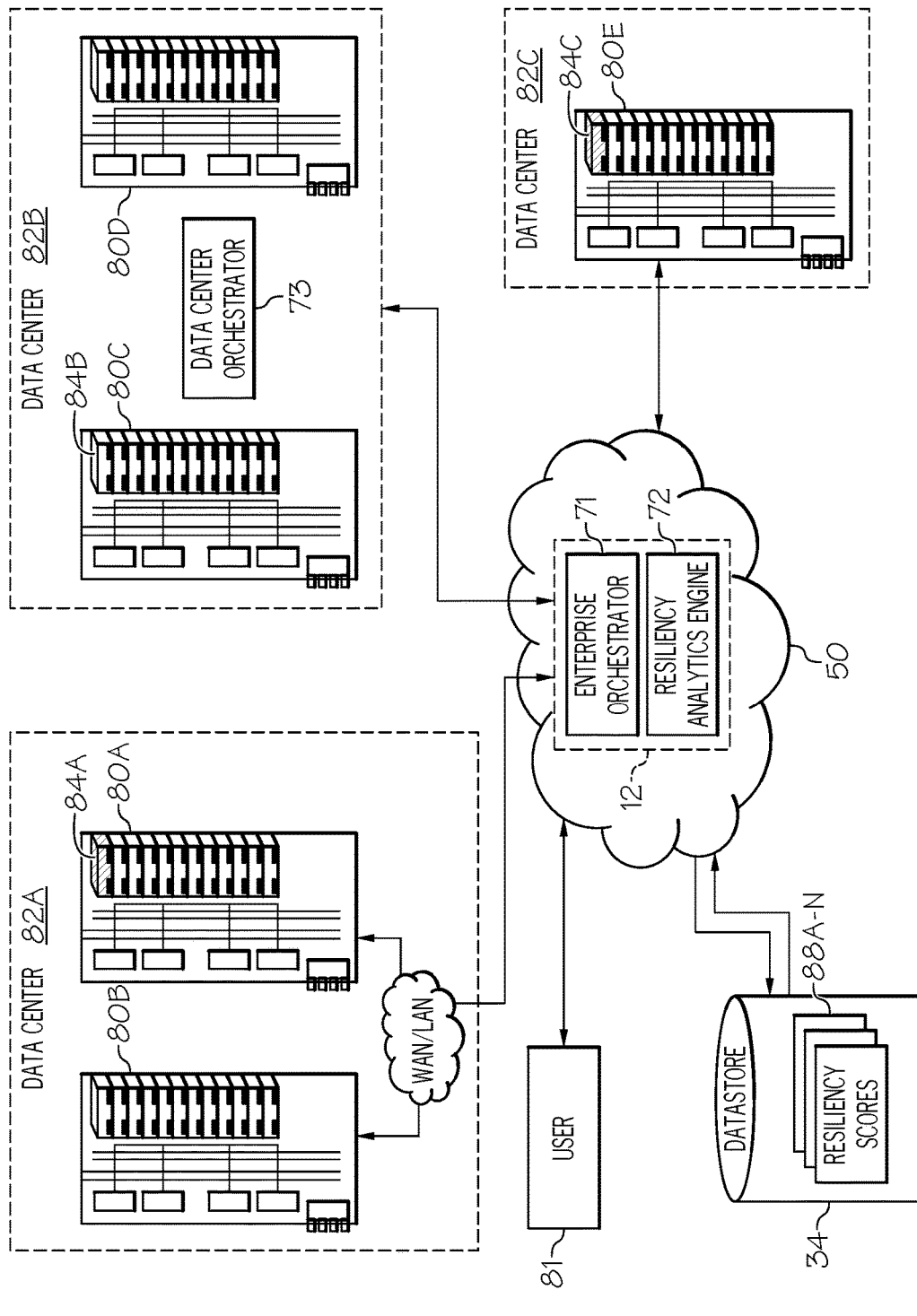
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment). In an embodiment, networked computing environment 70 is an enterprise computing environment. A stand-alone computer system/server 12 is shown in FIG. 4 for illustrative purposes only. In the event the teachings recited herein are practiced in a networked computing environment 70, each physical server 80N (hereinafter: generically singular 80N, generically plural 80A-N) need not have a resiliency analytics engine (hereinafter "system 72"). Rather, system 72 could be loaded on a server or server-capable device that communicates (e.g., wirelessly) with one or more physical servers 80A-N to resiliency-based workload allocation therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Figure 5:
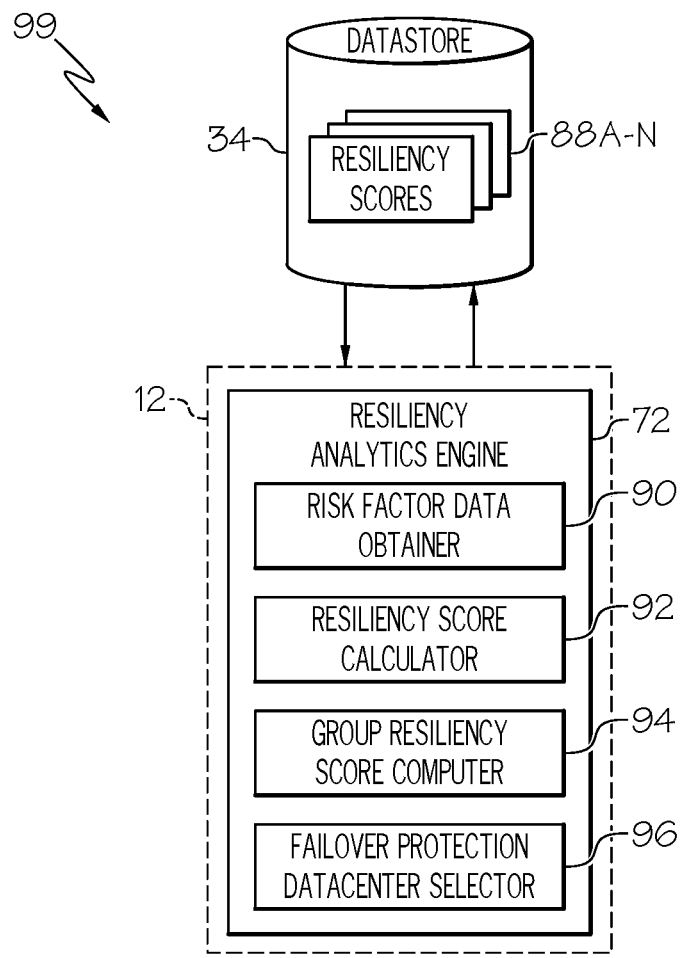
FIG. 5 depicts an example process components diagram according to an embodiment of the present invention.

Referring now additionally to FIG. 5, process components diagram 99 is depicted according to an embodiment of the present invention. System 72 may perform multiple functions similar to a general-purpose computer. Specifically, among other functions, system 72 can provide workload allocation for one or more applications 84N (hereinafter: generically singular 84N, generically plural 84A-N) of a plurality of computing nodes on server 80A-N in data centers 82A-N (hereinafter: generically singular 82N, generically plural 82A-N) in a networked computing environment 70. To accomplish this, system 72 can include: a risk factor data obtainer 90, a resiliency score calculator 92, a group resiliency score computer 94, and a failover protection datacenter selector 96.

As shown, any server 80N in any datacenter 82N can host and/or provide a failover protection for a number of applications 84A-N being hosted thereon. One or more of applications 84A-N can be hosted on or included in traditional virtual machine (VM) instance. Such a VM instance can be included in a data center 82N as a virtual server on physical server 80N. It should be understood that a VM instance is different from a process virtual machine. A process virtual machine is a platform dependent engine, such as a Java® Virtual Machine, that executes platform independent code written in a high-level programming language, such as Java, for performing a specific task (Java and Java Virtual Machine are trademarks of Oracle and/or its affiliates in the United States and/or elsewhere). In contrast, a VM instance is a virtual system that simulates an entire computing environment. To this extent, rather than performing only a single task, a VM instance is an environment that can include an operating system, middleware, one or more applications, and/or the like, within which a variety of tasks, functions, operations, etc., can be carried out by a user, such as by executing one or more applications thereon. As such, a VM instance can be made to simulate a stand-alone computer system in the eyes of a user.

To this extent, in a VM instance-type environment, server 80N can include a virtualization hypervisor at the lowest level. The virtualization hypervisor can run directly on the physical server 80N, referred to as a bare metal (BM) configuration, or, alternatively, can run on a server operating system running on the physical server 80N. In any case, the virtualization hypervisor provides a platform that allows multiple "guest" virtual server systems that host applications 84A-N to run concurrently on the physical server 80N. To this extent, the virtualization hypervisor provides an abstraction level between the hardware level of physical server 80N and the higher level software functions of each virtual server and the applications 84A-N hosted thereon. In order to provide these software functions, each virtual server-based computing node can contain everything that is necessary to simulate a "guest" instance of a particular virtual server on physical server 80 via the virtualization hypervisor. To this extent, each virtual server-based computing node can include an operating system, middleware, one or more applications 84A-N, and/or the like.

Additionally or in the alternative, one or more of virtual server-based computing nodes can be or include a container virtual machine (VM) such as may be found in the container-based networked computing environment. Unlike with traditional VM instances, a container VM does not include a virtualization hypervisor at the lowest level. Rather, in a container-based networked computing environment, an operating system runs directly in a bare metal (BM) configuration on the physical server 80N and one or more containers run on the same operating system. As with a VM instance, containers can each provide middleware, one or more applications, and/or the like. However, because the operating system is running in a BM configuration, no operating system need be included within the virtual server-based computing node itself. This allows any container to be made operational more quickly than a traditional hypervisor-based VM instance, while still maintaining the functional independence and other characteristics thereof.

In any case, to provide continuous availability for a user 81 to applications 84A-N, an enterprise computing environment can provide failover protection therefor. Failover protection generally involves temporarily or permanently relocating one or more applications 84N that have become inaccessible or for which a high risk is determined that the application(s) 84N may become inaccessible in the current environment. To this extent, failover protection can provide disaster recovery in a number of different scenarios. Some of these scenarios involve natural disasters that affect the computer components (hardware and/or software) of the systems hosting an application, which can include: earthquakes, storms, flooding, extreme temperature, and/or the like. Alternative, other scenarios involve systemic failures to the computer components themselves, including, but not limited to: mechanical failure, system update, malware attack, communications failure, and/or the like.

Figure 6:
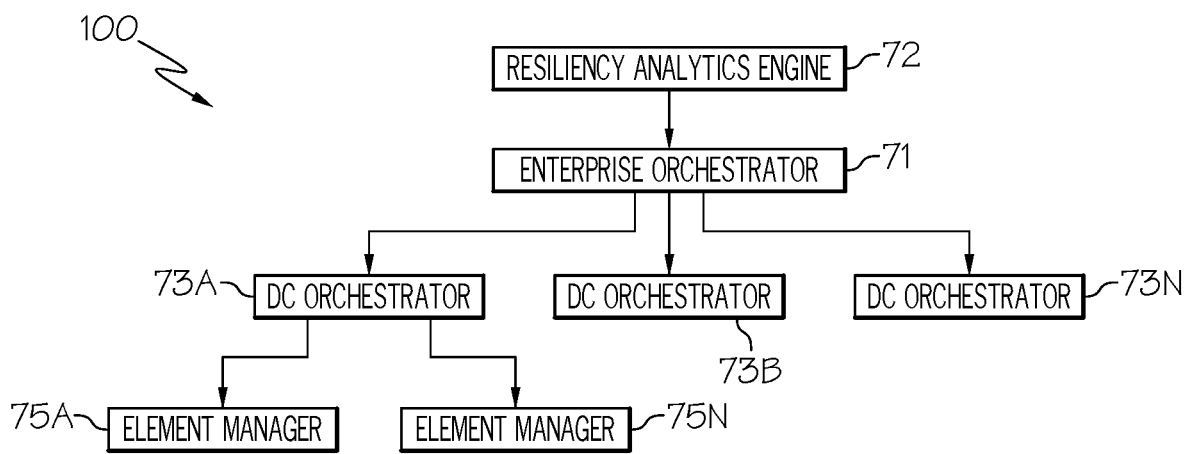
FIG. 6 depicts an example component diagram according to an embodiment of the present invention.

Referring now to FIG. 6, an example component diagram 200 is depicted according to an embodiment of the present invention. Referring additionally to FIGS. 4 and 5, as shown, enterprise computing environments utilizes an enterprise orchestrator 71. Enterprise orchestrator 71 manages the applications 84A-N that are hosted in the enterprise computing environment by, e.g., providing replication technology and assigning priorities to the applications 84A-N. The management provided by enterprise orchestrator 71 can include determining which data center 82N and/or which server 80N in data center 82N will host each application 84N. As part of allocating applications 84A-N, enterprise orchestrator can also provide priority-based failover protection to applications 84A-N in situations where disaster recovery is needed. To provide these functions, enterprise orchestrator can interact with a number of data center orchestrators (DC orchestrator) 73A-N. Each DC orchestrator 73N can provide information regarding applications 84A-N hosted on an associated data center 82N to enterprise orchestrator 71. In addition, enterprise orchestrator 71 can issue instructions to the DC orchestrators 73A-N for carrying out the management of applications 84A-N. A DC orchestrator 73 may, in turn, interact with one or more element managers 75A-N to accomplish these same management functions at the server 80N or component level.

The inventors of the invention described herein have discovered certain deficiencies in the current solutions for facilitating workload allocation. For example, enterprise computing environments in existence today use static allocation to determine to which server 80N an application 84N fails over. However, there is currently no solution for determining whether the statically determined failover server may itself be subject to failure. In addition, current solutions have no way of moving only a portion of the workload in response to a failure that only affects components required to host a portion of the applications 84A-N or, alternatively, to move applications 84A-N to systems in which the components required to host the failed over application 84N are resilient, even though other components in the system may not necessarily be optimal.

Certain embodiments of the present invention may offer various technical computing advantages, including a more comprehensive solution for evaluating and measuring the resiliency of an enterprise system down to the application level. To accomplish this, the present invention gathers global datacenter and cloud environment component information over time and analyzes the data to provide predictive resilience scores and identify areas on how to improve scores to meet industry expected recovery point objectives (RPO) and recovery time objectives (RTO) As a result, business services availability can improve at a component level, application 84N level, server 80N level, data center 82N level, and/or a global scale, and loss of data and/or business functionality can be improved. The resiliency scores 88A-N generated therefrom provide a standardized solution for comparing application operating environments in an enterprise computing environment. These scores can be aggregated to allow the stability of elements at any level and/or location within the enterprise system to be determined, enabling precision changes that improve the stability of the enterprise computing environment to be performed. Moreover, in cases in which disaster recovery is needed, resiliency scores 88A-N can be leveraged to determine whether less than all applications 84A-N need to be failed over, which applications 84A-N need to be failed over, whether a currently assigned failover system is stable enough to host the application(s) 84N, and which failover system(s) would be optimal for failover hosting of the application 84N based on resiliency scores 88A-N. To this extent, certain embodiments of the present invention increase the stability of physical servers 80 and the availability of hosted applications 84A-N and dynamically determine where to best move the workload, saving time and resources.

Referring again to FIGS. 4-6, risk factor data obtainer 90 of system 72, as executed by computer system/server 12, is configured to obtain risk factor data for each component of a plurality of components in a global data center. To accomplish this, data is collected using a number of different solutions. For example, in cases in which components of an enterprise computing system are periodically tested, results of the testing can be forwarded to resiliency analytics engine 72 (e.g., by way of enterprise orchestrator 71) from the appliance(s) used to perform the testing.

Additionally or in the alternative, resiliency analytics engine agents can execute at various levels of the datacenter infrastructure and application layers. These resiliency analytics engine agents can collect data in real time about factors that can affect whether a particular application 84N, component, server 80N, data center 82N, etc., can be continuously available. The data collected by the resiliency analytics engine agents can be forwarded to resiliency analytics engine 72 for processing. Additionally, or in the alternative, in embodiments in which resiliency analytics engine 72 operates in conjunction with enterprise orchestrator 71, the data collected by the resiliency analytics engine agents can be forwarded to a local DC orchestrator 73N or element manager 75N, which can, in turn, forward the data to enterprise orchestrator 71 for sharing with resiliency analytics engine 72. This data can include information about such factors as: component age, component performance, component workload, network speed, internal temperature, external weather conditions and expected weather conditions, existence of and/or potential for natural disaster at a particular location; existence of and/or potential for human made disaster at a particular location.

Referring now to FIG. 7, a table 200 of example risk factor data is depicted according to an embodiment of the invention. As shown, the risk factor data may be represented in a number of different attributes 102A-N. It should be understood that attributes 102A-N should not be understood as being comprehensive. Rather, data having more, fewer, and/or different attributes 102A-N can be obtained.

Referring again to FIGS. 4-7, resiliency score calculator 92 of system 72, as executed on computer system/server 12, is configured to calculate a resiliency score 88N for each component of the plurality of components in the enterprise computing system. Each component-based resiliency score 88N is calculated based on a set of risk factors that are applicable to the component gathered from the risk factor data. To do this, each attribute 102N into which the risk factor data has been characterized is classified into one of a number of severities 104A-N (e.g., low, medium, and high as shown in FIG. 7). Based on the severity level 104N of a particular attribute 102N, a weight 106N is assigned. As such, disaster events and/or testing failures that are more severe are scored more harshly than less severe incidents. For example, an incident in which small issues (within 20% of the industry specified RTO) occurred during a last actual disaster could be rated as low severity and assigned a weight of 25. In contrast, an incident in which major issues (more than 50% of the industry specified RTO) occurred during a last actual disaster could be rated as high severity and assigned a weight of 80. Moreover, the weighting of resiliency scores 88A-N can be temporal in nature such that the impact of negative historic data diminishes over time. It should be understood that although the examples of weights provided herein are on a scale of 0-100, this does not have to be the case. Rather, weighting could be carried out using any scale and/or weighting solution now known or later discovered.

To this extent, the resiliency scores 88A-N calculated by resiliency score calculator 92 take into account how each aspect of the organization performed during latest test/actual disasters. It also takes into account the change management process to keep production in synchronization with disaster recovery capability, and available capacity for disaster recovery both at the application/component and the organization layer.

Group resiliency score computer 94 of system 72, as executed on computer system/server 12, is configured to compute a set of group resiliency scores 88A-N by aggregating the resiliency scores 88A-N for each of the plurality of components included in a component group. To accomplish this, weighted component-level resiliency scores 88A-N for components that are included in a particular group entity (e.g., application 84N, server 80N, data center 82N, enterprise, etc.) are aggregated. For example, an application-level resiliency score 88N can be calculated based on an aggregation of resiliency scores 88A-N associated with components required to host the application. Similarly, a datacenter-level resiliency score 88N can be computed by aggregating all components in the datacenter. Still further, an enterprise-level resiliency score 88N can be computed based on an aggregation of datacenter-level resiliency scores 88A-N for all datacenters in the enterprise. To this extent, group resiliency score computer 94 provides a holistic resiliency score 88N for the organization across multiple domains, data centers and technologies.

In addition, further weighting adjustments can be made based on the group entity being scored. To this extent, resiliency score weights can gauge the enterprise wide disaster recovery posture, obtaining an overall business view to gauge improvement or degradation overtime of the disaster recovery posture for multiple datacenters. The enterprise resiliency score 88N can be broken down to component datacenter scores, to further understand which DC component requires remediation. The ability to score elements of each data center 82N at any level of granularity allows improvement areas in a datacenter to be identified based on resiliency scores 88A-N corresponding to components in the datacenter. For example, the ability of the resiliency scores 88A-N to be computed based on data about performance and requirements metrics, as well as disaster performance, enables them to be used to improve the overall resilience posture of the enterprise globally and help respond to any type of event, including, but not limited to, cyber events, changes in performance, business requirements, and sudden changes in workload. Based on this identification, resiliency analytics engine 72 can provide a report which describes the remediation steps and which disaster control sites are ready and enabled to recover the enterprises critical applications. This allows the organization to get a full enterprise wide understanding why resiliency score 88N levels have been assigned and what steps can be taken to remediate issues, allowing the enterprise to increase an overall resiliency score 88N by looking at the enterprise as a whole. Moreover, updates and maintenance of runbooks, presence of an orchestration engine and the ability to move data across borders is also accounted for while calculating the enterprise application resiliency score 88N.

Failover protection datacenter selector 96 of system 72, as executed on computer system/server 12, is configured to select a datacenter 82N or a particular server 80N within the datacenter 82N for failover protection based on a group resiliency score 88N corresponding to the datacenter 82N/ server 80N. To accomplish this, in response to an interruption or potential interruption to an application 84N, the components required to host the application 84N are identified. Based on this identification, application-level resiliency scores 88A-N corresponding to each of a plurality of potential failover sites are obtained based on the components required to host the application 84N. The application-level resiliency score 88N corresponding to the datacenter 82N/ server 80N is used to select the datacenter 82N/server 80N for failover protection. To this extent, the applications 84A-N specifically affected by the disaster can be identified and only these applications need to be failed over. Moreover, applications 84A-N requiring disaster protection can be specifically allocated to different destinations based on resiliency scores 88A-N of the destinations such that sites that have resiliency scores 88A-N that are non-optimal in only certain areas can host applications 84A-N that do not use these components, while other applications 84A-N that do use these components are allocated to other sites. To this extent, resiliency scores 88A-N can be used to enable enterprise orchestrator 71 or any other decision maker to make decisions to perform switchover and/or switchback in response to partial application failover as well as actual disasters.

Figure 8:
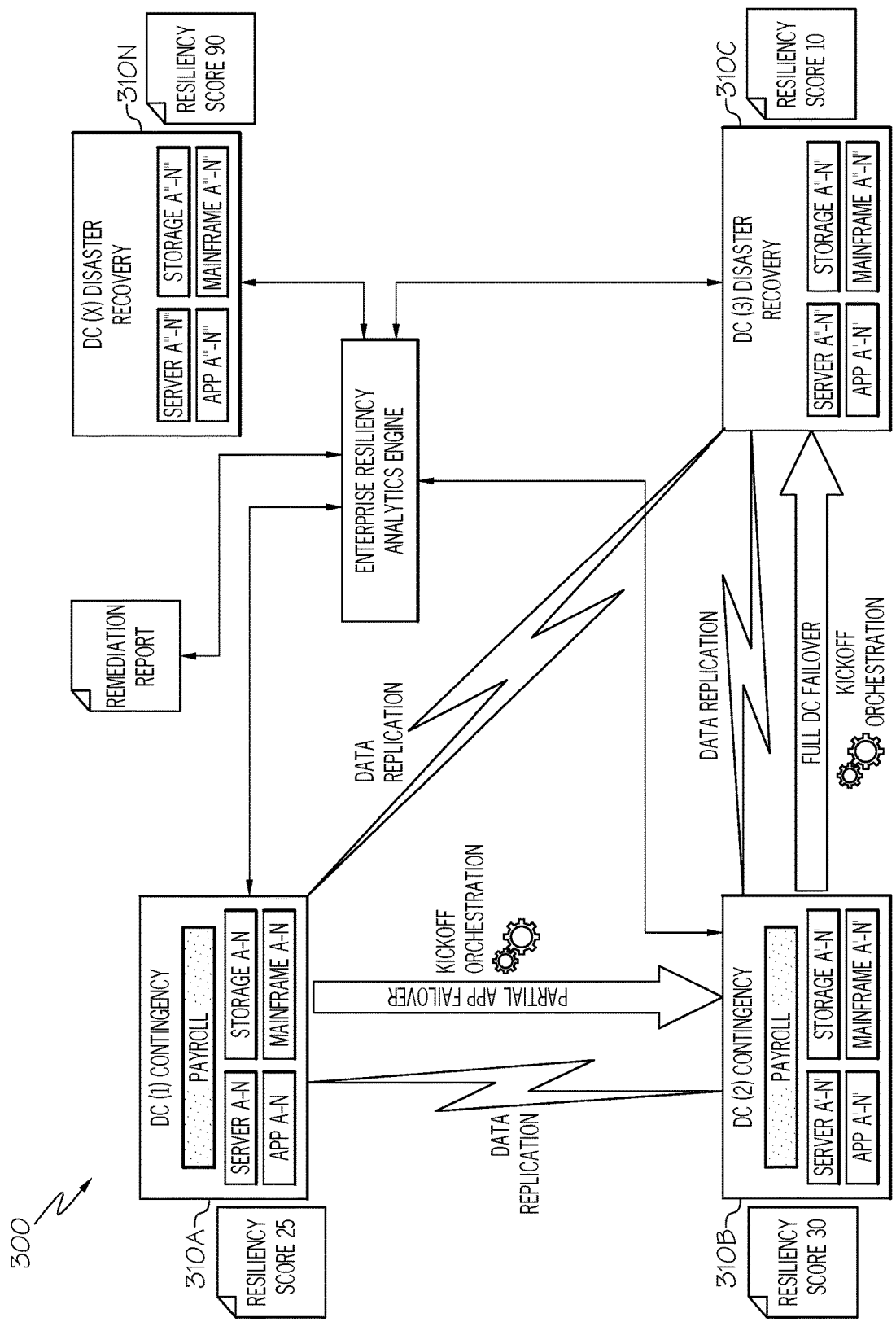
FIG. 8 depicts an example system diagram according to an embodiment of the invention.

Referring now to FIG. 8, an example system diagram 300 is depicted according to an embodiment of the present invention. As shown, system diagram 300 depicts a number of datacenters (DC) 310A-N: including DC (1) primary 310A, DC (2) contingency 310B, and DC disaster recoveries (3) 310C and (X) 310N. Based on the depicted systems and their associated resiliency scores 88A-N, DC (1) 310A and DC (2) 310B both host applications 84A-N and technology that can partially recover to either site. For example, if the payroll application 84N on DC (1) 310A fails, it can be failed over to DC (2) 310B because the resiliency score 88N for those components on DC (2) 3106 have relatively good resiliency even though the overall resiliency score 88N of DC (2) 310B may not be optimal. Further, either or both of DC (1) 310A and DC (2) 310B can recover one at a time or simultaneously with core application sets to DC (3) 310C. Moreover, in situations where the resiliency score 88N in DC (3) 310C becomes elevated (e.g., due to change management in DC (1) 310A and DC (2) 310B not reflected in DC3 or due to an imminent natural disaster), then failover protection datacenter selector 96 will only trigger a partial recovery to switch applications 84A-N from DC (1) 310A to DC (2) 310B or vice versa. The resiliency analytics engine 72 (e.g., utilizing enterprise orchestrator 71) will integrate and automatically trigger existing infrastructure orchestration tools (Rackware, Zerto, Veeam, VMware SRM, CRO, etc.) to move an entire DC (1) 310A and/or DC (2) 310B to DC (3) 310C or move applications between DC (1) 310A and DC (2). (Rackware is a Trademark of Rackware, Inc., Zerto is a trademark of Zerto Ltd., Veeam is a trademark of Veeam Software AG Corp., VMware is a trademark of VMware, Inc., and CRO is a trademark of CRO, Inc., and/or their affiliates in the United States and/or elsewhere) As such, granularity to move from an entire DC 310A-N or from an app perspective can be performed based on DC resiliency score 88N conditions.

As a result, the health of a disaster recovery site can be understood to aid in analyzing and automatically making decisions to move applications in a disaster situation by auto triggering data center infrastructure virtual machine orchestration tools, such as enterprise orchestrator 71. If there is a natural disaster which threatens a recovery site then resiliency analysis engine 72 makes the decisions to recovery to an alternate enterprise contingency center. This granular view provides a view to recovery site uptime and/or that of any datacenter to switch over and switch back applications successfully. Global disaster recovery sites that do not have the orchestration tools of the resiliency analysis engine 72 will be flagged as high risk so the client can remediate and provide recommendation to be manually executed.

Figure 9:
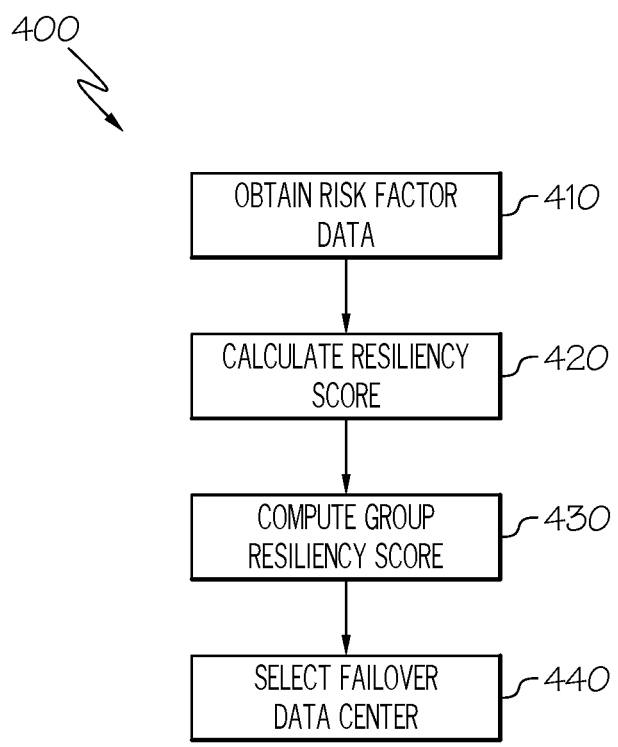
FIG. 9 depicts an example process flowchart according to an embodiment of the present invention.

Referring now to FIG. 9 in conjunction with FIGS. 4 and 5, a process flowchart 400 according to an embodiment of the present invention is shown. At 410, risk factor data obtainer 90 of system 72, as executed by computer system/ server 12, obtains risk factor data for the global data center for each component of a plurality of components in the global data center. At 420, resiliency score calculator 92, as executed by computer system/server 12, calculates a resiliency score 88N for each component of the plurality of components based on risk factors that are applicable to the component. At 430, group resiliency score computer 94, as executed by computer system/server 12, computes a set of group resiliency scores 88A-N by aggregating the component-based resiliency scores 88A-N for components in the component group. At 440, failover protection datacenter selector 96, as executed by computer system/server 12, selects a datacenter for failover protection based on a group resiliency score 88N of the datacenter in response to an interruption to an application.

The process flowchart of FIG. 9 and block diagrams of the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While shown and described herein as an approach for providing workload allocation in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for providing workload allocation in a networked computing environment. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for providing workload allocation in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for providing workload allocation in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for providing workload allocation in a networked computing environment, comprising:
   obtaining, for each component of a plurality of components in a global data center, risk factor data for the global data center;
   calculating a resiliency score for each component of the plurality of components based on a set of risk factors that are applicable to the component gathered from the risk factor data;
   computing a plurality of group resiliency scores by aggregating the resiliency scores for each of the plurality of components included in a component group, the plurality of group resiliency scores allowing a stability of elements to be determined at any level and at any location within the global data center and including a set of application-level resiliency scores, each application-level resiliency score pertaining to components within a particular data center in the global data center that are required to host the application and being calculated based on an aggregation of resiliency scores associated with components required to host the application; and selecting, in anticipation of an interruption to a function of an application being performed by a first component, a datacenter having a complimentary component to the first component for failover protection based on a resiliency score of the complimentary component and the application-level resiliency score corresponding to the datacenter, wherein any functions of the application that are not part of the interruption are not failed over.

2. The method of claim 1, further comprising identifying improvement areas in a datacenter based on resiliency scores corresponding to components in the datacenter, wherein the improvement areas can be identified at any level of granularity.

3. The method of claim 1, wherein the plurality of group resiliency scores further includes:
   a set of datacenter-level resiliency scores computed by aggregating all components in each datacenter; and
   an enterprise-level resiliency score based on an aggregation of datacenter-level resiliency scores for all datacenters in the enterprise.

4. The method of claim 3, the selecting of the datacenter further comprising:
   identifying the components required to host the application;
   obtaining application-level resiliency scores corresponding to each of a plurality of potential failover sites based on the components required to host the application; and
   selecting the datacenter for failover protection based on the application-level resiliency score corresponding to the datacenter.

5. The method of claim 1, further comprising:
   weighting each risk factor in the risk factor data based on a length of time from a most recent incident;
   weighting each risk factor in the risk factor data based on a severity of the most recent incident,
   wherein the most recent incident is at least one of a stress test or an actual disaster.

6. The method of claim 1, further comprising:
   determining, in response to an interruption to a function of an application being performed by a first component, whether the datacenter selected for failover protection is stable enough to host the application based on a real time computation of the application-level resiliency score of the datacenter; and
   selecting a new set of failover systems that would be optimal for failover hosting of the application based on the real time computation of application-level resiliency scores.

7. The method of claim 1, wherein the networked computing environment is a cloud computing environment and wherein the data center is a resource within the cloud computing environment.

8. An enterprise computing environment, comprising:
   a set of computer data centers;
   a plurality of servers within each data center of the set of data centers, each server plurality of servers hosting a set of applications; and
   a processor that executes a set of instructions that causes an enterprise orchestrator to manage the set of applications corresponding to each of the plurality of servers within the set of computer data centers, the set of instructions including a method for providing workload allocation in the enterprise computing environment, the method comprising:
      obtaining, for each component of a plurality of components in a global data center, risk factor data for the global data center;
      calculating a resiliency score for each component of the plurality of components based on a set of risk factors that are applicable to the component gathered from the risk factor data;
      computing plurality of group resiliency scores by aggregating the resiliency scores for each of the plurality of components included in a component group, the plurality of group resiliency scores allowing a stability of elements to be determined at any level and at any location within the global data center and including a set of application-level resiliency scores, each application-level resiliency score pertaining to components within a particular data center in the global data center that are required to host the application and being calculated based on an aggregation of resiliency scores associated with components required to host the application; and
      selecting, in anticipation of an interruption to a function of an application being performed by a first component, a datacenter having a complimentary component to the first component for failover protection based on a resiliency score of the complimentary component and the application-level resiliency score corresponding to the datacenter, wherein any functions of the application that are not part of the interruption are not failed over.

9. The enterprise computing environment of claim 8, the method further comprising identifying improvement areas in a datacenter based on resiliency scores corresponding to components in the datacenter, wherein the improvement areas can be identified at any level of granularity.

10. The enterprise computing environment of claim 8, wherein the plurality of group resiliency scores further includes:
    a set of datacenter-level resiliency scores computed by aggregating all components in each datacenter; and
    an enterprise-level resiliency score based on an aggregation of datacenter-level resiliency scores for all datacenters in the enterprise.

11. The enterprise computing environment of claim 10, the selecting of the datacenter further comprising:
    identifying the components required to host the application;
    obtaining application-level resiliency scores corresponding to each of a plurality of potential failover sites based on the components required to host the application; and
    selecting the datacenter for failover protection based on the application-level resiliency score corresponding to the datacenter.

12. The enterprise computing environment of claim 8, the method further comprising:
    weighting each risk factor in the risk factor data based on a length of time from a most recent incident;
    weighting each risk factor in the risk factor data based on a severity of the most recent incident,
    wherein the most recent incident is at least one of a stress test or an actual disaster.

13. The enterprise computing environment of claim, the method further comprising:
   determining, in response to an interruption to a function of an application being performed by a first component, whether the datacenter selected for failover protection is stable enough to host the application based on a real time computation of the application-level resiliency score of the datacenter; and
   selecting a new set of failover systems that would be optimal for failover hosting of the application based on the real time computation of application-level resiliency scores.

14. The enterprise computing environment of claim 8, wherein the enterprise computing environment is a cloud computing environment and wherein each of the servers is a resource within the cloud computing environment.

15. A computer program product embodied in a computer readable storage medium that implements a method for providing workload allocation in a networked computing environment, the method comprising:
   obtaining, for each component of a plurality of components in a global data center, risk factor data for the global data center;
   calculating a resiliency score for each component of the plurality of components based on a set of risk factors that are applicable to the component gathered from the risk factor data;
   computing a plurality of group resiliency scores by aggregating the resiliency scores for each of the plurality of components included in a component group, the plurality of group resiliency scores allowing a stability of elements to be determined at any level and at any location within the global data center and including a set of application-level resiliency scores, each application-level resiliency score pertaining to components within a particular data center in the global data center that are required to host the application and being calculated based on an aggregation of resiliency scores associated with components required to host the application; and
   selecting, in anticipation of an interruption to a function of an application being performed by a first component, a datacenter having a complimentary component to the first component for failover protection based on a resiliency score of the complimentary component and the application-level resiliency score corresponding to the datacenter, wherein any functions of the application that are not part of the interruption are not failed over.

16. The computer program product of claim 15, the method further comprising identifying improvement areas in a datacenter based on resiliency scores corresponding to components in the datacenter, wherein the improvement areas can be identified at any level of granularity.

17. The computer program product of claim 15, wherein the plurality of group resiliency scores further includes:
   a set of datacenter-level resiliency scores computed by aggregating all components in each datacenter; and
   an enterprise-level resiliency score based on an aggregation of datacenter-level resiliency scores for all datacenters in the enterprise.

18. The computer program product of claim 17, the selecting of the datacenter further comprising:
   identifying the components required to host the application;
   obtaining application-level resiliency scores corresponding to each of a plurality of potential failover sites based on the components required to host the application; and
   selecting the datacenter for failover protection based on the application-level resiliency score corresponding to the datacenter.

19. The computer program product of claim 15, the method further comprising further comprising:
   weighting each risk factor in the risk factor data based on a length of time from a most recent incident;
   weighting each risk factor in the risk factor data based on a severity of the most recent incident,
   wherein the most recent incident is at least one of a stress test or an actual disaster.

20. The computer program product of claim 15, the method further comprising:
   determining, in response to an interruption to a function of an application being performed by a first component, whether the datacenter selected for failover protection is stable enough to host the application based on a real time computation of the application-level resiliency score of the datacenter; and
   selecting a new set of failover systems that would be optimal for failover hosting of the application based on the real time computation of application-level resiliency scores.

* * * * *